United States Patent [19]

McNair

[11] Patent Number: 4,922,393
[45] Date of Patent: May 1, 1990

[54] LAMP APPARATUS
[75] Inventor: Rhett McNair, Anaheim, Calif.
[73] Assignee: Scientific Component Systems, Inc., Anaheim, Calif.
[21] Appl. No.: 679,281
[22] Filed: Dec. 7, 1984

Related U.S. Application Data

[63] Continuation-in-part of Ser. No. 645,288, Aug. 29, 1984, Pat. No. 4,641,228, which is a continuation-in-part of Ser. No. 479,059, Mar. 25, 1983, Pat. No. 4,520,436.

[51] Int. Cl.$^5$ .............................................. F21V 21/02
[52] U.S. Cl. ..................................... 362/225; 362/364
[58] Field of Search ............................... 362/147–150, 362/225, 260, 364–366

[56] References Cited

U.S. PATENT DOCUMENTS

| | | | |
|---|---|---|---|
| 1,844,639 | 2/1932 | Crumpton | 362/148 |
| 2,022,222 | 11/1935 | Sullivan | |
| 2,211,258 | 8/1940 | Delfel | |
| 2,330,935 | 10/1943 | Tuck | |
| 2,878,372 | 3/1959 | Fry | 362/216 |
| 2,998,511 | 8/1961 | Chan | 362/147 |
| 3,302,019 | 1/1967 | Menzin | |
| 3,375,368 | 3/1968 | Dorsky | |
| 3,488,626 | 1/1970 | Koerper et al. | 362/365 |
| 3,518,420 | 6/1970 | Kripp | |
| 3,660,651 | 5/1972 | Miles, Jr. | |
| 3,742,208 | 6/1973 | Mills | |
| 3,767,913 | 10/1973 | Trevithick | |
| 3,801,815 | 4/1974 | Docimo | |
| 3,860,829 | 1/1975 | Fabbri | |
| 3,991,905 | 11/1976 | Nicpon | 362/260 |
| 4,070,568 | 1/1978 | Gala | 362/311 |
| 4,086,480 | 4/1978 | Lahm | 362/148 |
| 4,141,061 | 2/1979 | Ford et al. | 362/260 |
| 4,232,361 | 11/1980 | Kelsail | 362/364 |
| 4,300,073 | 11/1981 | Skwirut et al. | 315/53 |
| 4,313,154 | 1/1982 | Capostagno et al. | 362/365 |
| 4,318,160 | 3/1982 | Dooley et al. | 362/216 |
| 4,327,402 | 4/1982 | Aubrey | 362/288 |
| 4,347,460 | 8/1982 | Latassa et al. | 315/63 |
| 4,389,595 | 6/1983 | Kamei et al. | 315/57 |
| 4,459,648 | 7/1984 | Ullmann | 362/147 |
| 4,520,436 | 5/1985 | McNair et al. | 362/366 |
| 4,641,228 | 2/1987 | McNair | 362/382 |
| 4,704,664 | 11/1987 | McNair | 362/225 |

OTHER PUBLICATIONS

Lighting Products, Inc. Catalog (U.S.A., Feb. 1980).

Primary Examiner—Charles J. Myhre
Attorney, Agent, or Firm—James C. Wray

[57] ABSTRACT

A recessed lamp reflector has an integrally formed trim ring and fluorescent tube receptacles on opposite sides of an upper portion of the reflector. Fluorescent tubes extend across and downward, in the reflector, crossing at a central point within an upper portion of the reflector. Ballasts are mounted on an upper surface of the reflector between lamp receptacles. A cover covers the ballast and receptacles and interconnections and rests on top of the reflector.

20 Claims, 2 Drawing Sheets

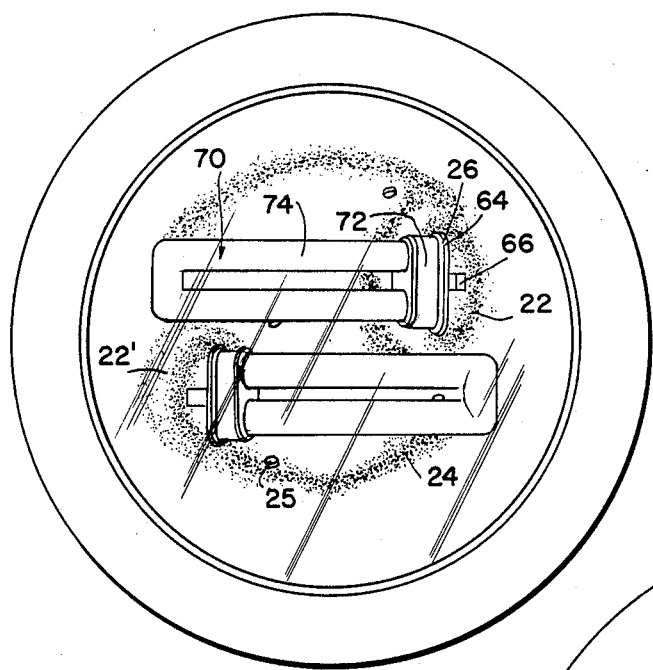
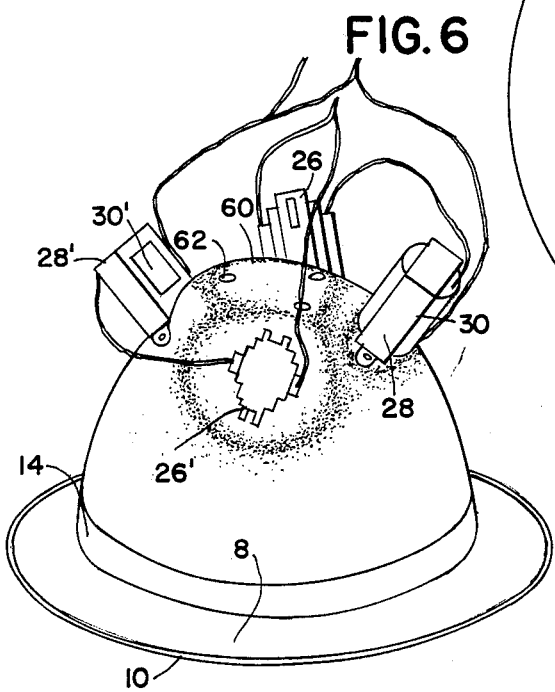
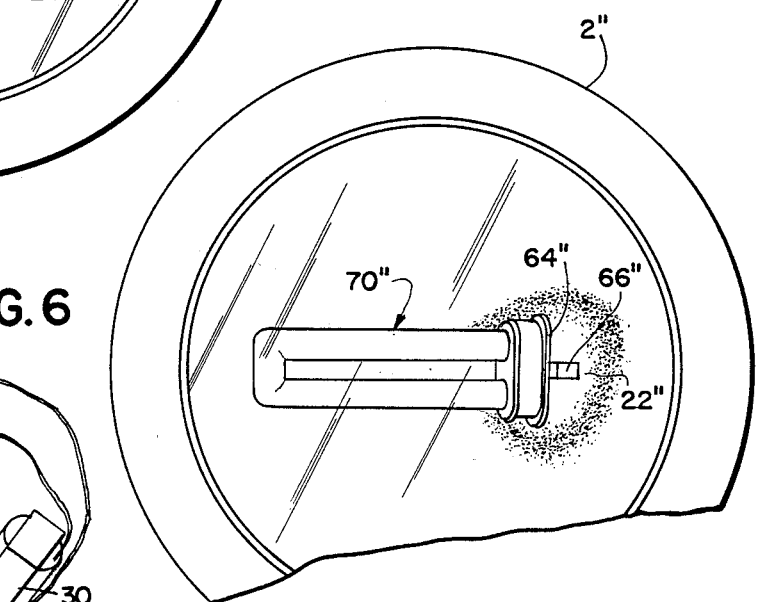
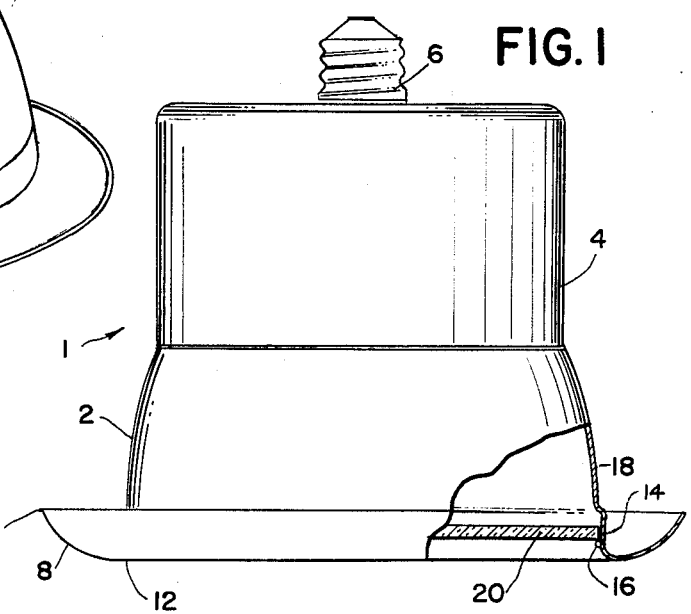

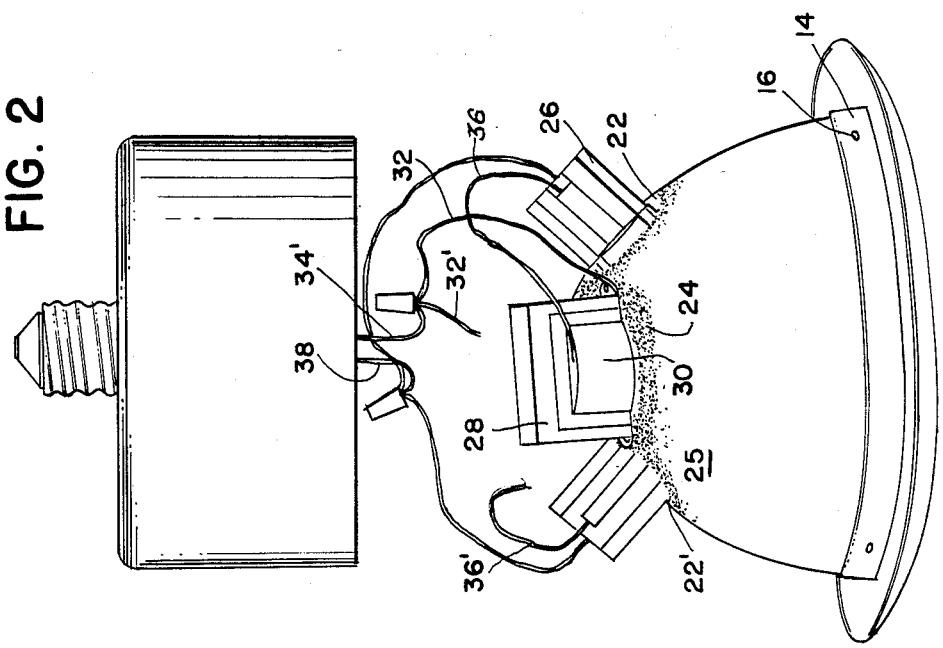
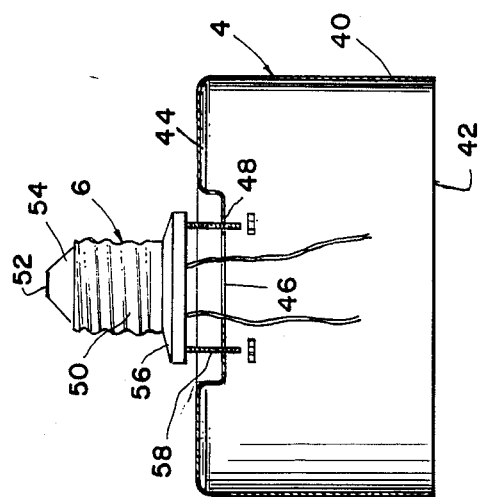

LAMP APPARATUS

BACKGROUND OF THE INVENTION

This is a continuation in part of co-pending application 645,288, filed Aug. 29, 1984, now U.S. Pat. No. 4,641,228 which is a continuation-in-part of 479,059 filed Mar. 25, 1983, now U.S. Pat. No. 4,520,436.

Recessed ceiling lighting is a highly desirable light source. Usually a cylindrical fixture is mounted in the ceiling. A socket connected to an L-shaped bracket is vertically adjustable within the cylindrical fixture to hold the reflector lamp at the deirable height. Before inserting the reflector lamp in the cylindrical housing and screwing the lamp base into the socket, a trim ring or baffle is added to the housing by attaching springs to the baffle or trim ring at diametrically opposite positions, and stretching the springs upward and attaching them to openings in the sheet metal cylindrical housing. This is time consuming and difficult and requires expensive parts and substantial labor in assembly and installation operations.

When the socket is not adjustable, the reflector lamp may be positioned too deep within the cylindrical fixture or may extend downward from the cylindrical fixture. If the L-shaped bracket is bent, the lamp may be off center or crooked in the housing, resulting in an unsightly appearance and improper direction of the illumination. The L-shaped bracket may be slightly bent and misaligned by the weight of the lamp which tends to turn the bracket.

The incandescent lamps which may be 75, 100 or 150 watts consume a large amount of power. The lamps have relatively short lives. Frequent replacement of expensive lamps adds to the cost of operating recessed ceiling lighting.

Lamps positioned within recessed fixtures have alignment problems and may misdirect light. Recessed ceiling fixtures have problems of heat buildup which may, among other things, increase temperature of operation and reduce life of the lamps.

Recessed ceiling fixtures require spce for connection of lamps and trim rings, reducing light transmitting area. Limited size of fixtures has heretofore limited configurations of lamps which would be mounted entirely within the fixtures.

The present invention is designed to overcome the drawbacks of the prior art devices by providing self-trimming and self-aligning ceiling lamps which are quickly and easily installed and energy consumption.

SUMMARY OF THE INVENTION

A recessed lamp reflector has an integrally formed trim ring. Fluorescent tube receptacles are mounted directl on opposite sides of an upper portion ofthe reflector. Fluorescent tubes extend across and downward, in the reflector, crossing near a central point within an upper portion of the reflector to provide an effective point source of focusable light. Ballasts are mounted directly on an upper surface of the reflector spaced from lamp receptacles. A cover covers the ballast and receptacles and interconnections. A lower edge of the cover abuts an indentation on the reflector.

The recessed ceiling lighting apparatus of the present invention fits within an opening in a surface, particularly, for example, in a ceiling of a room. Preferably, although not necessarily, a sheet metal can or container, usually in a cylindrical shape but in any appropriate shape is positioned behind the opening in the surface. An electrical outlet, for example a threaded socket or a bayonet or pin-type connector or a quick coupling connector or any other type of connector is positioned beyond the surface in such a manner that it is accessible through the opening. If the outlet is a threaded socket, usually the outlet is substantially centered beyond the opening.

The present invention has an electrical connector for connecting to the electical outlet, for example, a threaded electrical connector. A lamp is mounted inside a reflector, which is connected to the electrical connector. The reflector of the present invention preferably has the general shape of a parabola with a circular lower opening and an upward and inward curved sidewall which terminates in a rounded upper end. The reflector may be of any suitable size and shape, for example, the reflector may be truncated, conical, rectangular, square or any convenient shape. In a preferred embodiment, a lamp receptacle which may be any convenient receptable for receiving and holding a lamp is mounted externally on the reflector. the receptacle may be mounted in any convenient way, preferably directly on the reflector or on a device attached to the reflector in such a way that heat from the receptacle and from a lamp is transferred directly to the receptacle. The receptacle is connected to the reflector so that a lamp may be connected to the receptacle in such a way that the lamp is positioned within the reflector. In a preferred embodiment, the lamp is a high-output, low-wattage, long-life fluorescent lamp which extends across and slightly downward in the receptacle so that the ligth source is substantially centered in the reflector.

Two lamps are used in two receptacles in a preferred reflector. The lamps are slightly angularly offset so that the lamps closely approach each other at an upper, central position an the reflector. The lamps may be replaced with other light sources, for example, fluorescent sources, or neon sources or other sources.

The power supply may be electrical lines which are electrically connected to the lamp receptacles or step-up or step-down, fixed or variable transformers or reactances. Preferably, the power supplies are ballasts which control initiation and maintenacne of the glow discharge ionization in thet ubular light sources. The ballasts or other power supply devices may be mounted in a convenient way. Preferably, the ballasts are mounted directly on the refelctor to transfer heat to the reflector direclty from the ballasts and from receptacles. The heat is then conducted ot the integral trim ring which acts to sink the heat into the room, thus removing it from the ballast housing and allowing for efficient and safe operation of the ballast and lamps which increases the life of those components. This integral trim ring is a key feature of the invention. In addition to its heat sink function, it also interacts with the connection means to become a self leveler for the apparatus. Further, it allows a means of trimming the ceiling opening in an aesthetically pleasing manner while allowing for utilization of the full diameter of the ceiling opening for the radiation of useful light. This has not been possible with conventional means of trimming the ceiling opening as part of the diameter was used for connecting springs and other means which substantially reduced efficiency of the light source. It is preferable to mount one ballast directly opposite one lamp receptacle or to mount two ballasts and lamp receptacles in generally rectangular relationshp on the reflector.

The electrical connector may be connected directly to the reflector. The power supply and receptacles may be left uncovered. Preferably, a housing surrounds the power supply and receptacles. The electrical connector may be mounted on the reflector. In a preferred embodiment, the housing is held between the electrical connector and the reflector by fasteners.

Connection means connects the electrical connector to the reflector and preferably to the housing. In one embodiment the connection means are fasteners which extend through aligned openings in the electrical connector, the housing and the reflector. The fasteners may be any convenient type of fasteners, for example, bolts and nuts or riveted fasteners.

The preferred recessed ceiling lighting apparatus has an electrical connector means for connecting to an electrical outlet, reflector means connected to the electrical connector for reflecting light generated by the lighting apparatus, lamp receptacle menas connected to the reflector means for holding lamp means, and power supplying means connected to the lamp receptacle means and to the electrical connector means for supplying power from the electrical connector means to the lamp receptacle means. Lamp means is connected to the lamp receptacle means for providing lighting within the reflector. Connection means connected to the electrical connector means and to the reflector means holds the reflector means upward with the electrical connector means.

Trim ring means connected to the reflector means extends outward therefrom.

Preferably the trim ring means is integrally formed with the reflector means and extends outward from a lower edge of the reflector means.

Preferably the reflector means has a relatively small upper end and a relatively larger lower end, and the receptacle means is mounted on the smaller upper end of the reflector means.

In a preferred embodiment, the receptacle means is mounted on an outer wall of the lamp means, and the receptacle means has cavity means opening inward in the receptacle means. The lamp means are fluorescent tube lamp means having base means for connecting with the cavity means. The fluorescent tube lamp means extends downward and across the reflector means.

Preferably the lamp means comprise first and second fluorescent lamps which extend across and downward from the receptacle means at slight angles to each other wherein the lamp means cross at a central position within an upper portion of the reflector means, thereby creating a focal point from which the greatest portion of lumens are emitted, which allows for the effective use of a lensing material to direct light rays.

In the preferred embodiment the power supplying means are ballast means mounted directly on an upper portion of the reflector means.

Preferably the power supply means are first and second ballast means rectilinearly arranged with first and second receptacle means on an upper outer portioin of the reflector means.

Housing means for housing the power supplying means and the receptacle means are positioned between an upper portion of the reflector means and the electrical connector means.

Preferably the connection means are fastener means connected to the electrical connector means and to the reflector means for entrapping the housing means therebetween and for holding the reflector means upward toward the electrical connector means. Fastener means connect the cover means to the reflector means.

These and other and further objects and features of the invention are apparent in the disclosure which includes the above and ongoing specification with the claims and the drawings.

BRIEF DESCRIPTION OF THE DRAWINGS

FIG. 1 is a side elevation, partially in section of a lamp apparatus constructed according to the present invention.

FIG. 2 is an exploded detail of the lamp apparatus shown in FIG. 1.

FIG. 3 is an elevational detail view partially in section of the threaded base, cover and fasteners.

FIG. 4 is a perspectrive view of the reflector, trim ring, lamp receptacles and ballast, showing a preferred embodiment.

FIG. 5 is a bottom view o the lamp apparatus shown in FIGS. 1, 2 and 4.

FIG. 6 is an alternate embodiment showing a single lamp within the lamp apparatus.

DETAILED DESCRIPTION OF THE DRAWINGS

Representative embodiments of the invention are described with reference to the accompanying drawings.

Referring to the drawings, a lamp apparatus of the present invention is generally indicated by the numeral 1. The lamp apparatus comprsies a reflector 2, a cover 4 and a threaded base 6. A trim ring 8 with an outer edge 10 is integrally formed on the circular lower edge 12 of the reflector. A generally vertical lower wall portion 14 of the reflector has three dimples 16 pushed inward thereform. The principal wall 18 of the reflector has a generally parabolic shape.

As shown in FIG. 1, the three dimples 16 hold the lens place 20 within the reflector wall 14.

As shown in FIGS. 2 and 4, an upper portion of the reflector 2 has indentations 22 and 22' and 24 to provide substantially flat surfaces on which to mount elements on the upper portion 25 of the reflector. Lamp receptacles 26 and 26' are mounted on the flat surfaces of the depressions 22 and 22'. Reactance ballasts have frames 28 and 28' which are mounted on flat surfaces of depressions 24 and the mountings hold coils 30 and cores therein.

Wires 32 and 32' connect the coils 30 to the supply line 34. Wires 36 and 36' connect the coils to the receptacles which are in turn connected to the supply via wire 38. Cover 4 as shown in FIG. 3 has a generally cylindrical side wall 40 and a lower open end 42 which rests on the reflector and a closed upper end 44. A central portion 46 is open for permitting passage of wires. Two, three or four openings 48 receive a like number of fasteners.

Threaded base 6 has a conductive threaded wall 50 and an end conductor 52 which are separated by an insulator 54. Base 56 has openings for receiving fasteners 58 which extend through openings 48 in the cover 4 and through openings 62 in the upper end 60 of the reflector as shown in FIG. 4. Receptacle 26 has a collar 64 which fits within an opening in the reflector. A lateral clip 66 holds the receptacle collar within the opening. A fluorescent lamp 70 has a base 72 which is plugged into the receptacle by pushing the base into the receptacle. A tube 74 extends outward from base 72. In the preferred embodiment, as shown in FIG. 5, two tubes extend across and downward in the reflector and most closely approach each other and cross at a central position within an upper portion of the reflector.

In a single light source embodiment, as shown in FIG. 6, reflector 2" has a flattened area 22" with an opening which receives a rim 64" of a receptacle which is held in the opening by the clip 66". The flattened area and receptacle are oriented so that the lamp 70" projects downward and across a central portion of the reflector.

In the desired installation, one first turns off the power then removes the existing incandesdent reflector lamp and then removes the spring mounted trim ring or baffle. If the lamp socket is on an adjustable bracket, a wing nut on the side of the fixture may be loosened, the bracket may be pushed to a desired height, and the wing nut may be tightened.

The particular lamp configuration which has crossed tubes is preferred. The cross configuation provides a concentration of light where the tubes cross creates the nearest approach that one can create of an apparent point source of light. Becaue of the apparent point source of light created by the crossed tubes of the present invention, lensing can be provided.

The most desired lens 20 used in the present invention comprises a circular lens having a smooth upper side and a lenticular lower side which has the appearance of small regular bumps. The lens is designed to have a focal length which approximates the distance between the crossed point of the tubes and the lens surface. The prticular lens used in the present invention is made by KSH plastics of Tustin, California and is approximately four-hundredths of an inch thick. The lens is first extruded as a sheet material and rolled between two chromium rollers, one of which is flat and one of which has a reverse lenticular pattern. The lens is then cut to shape to fit within the trim ring end of the reflector.

The integral trim ring of the present invention has distinct advantages.

Primarily, the integral trim ring provides a heat sink to take away heat from ballast and lamps. Aluminum is the preferred material of the integrl reflector and trim ring because of its lightness and because of its excellent heat conductivity.

The particlar ballast used may be class B ballast with windings around the center of an E-shaped stack. The gapping between the legs of the stacks determines the reactance type resistance which the ballasts provide while the lamps are operating in their ionized low resistance states. Typically the ballast may operate up to 90 degrees centigrade, typically with the core operating at 66 degrees centigrade. The lamps operate at about up to 80 degrees centigrade. Typically, the top surface of the reflector may operate at about 57 degrees centigrade. The integrally-fomed trim rings uniformly carry away the heat.

Part of the operational heat is relieved by convection through openings in the cover, and part is removed by outward radiation from the cover and from the reflector. It is preferred that the ballast be mouted directly on the reflector. Heat transferred to the reflector from the ballast and lamps is conducted to the integrally formed trim ring where the large area of the trim ring acts as a heat sink or heat exchanger.

One of the primary functions of the integral trim ring of the present invention is that it allows substantially the entire ceiling opening for the transmission of light. Old trim rings take up part of the opening and reduce the available area for light output.

One of the primary features of the integral trim ring of the present invention is its new and unobvious self-leveling function. The integral trim ring bearing against the ceiling levels the lamp apparatus and holds the lamp apparatus in a vertical position for precision in directing and transmitting light from the lamp apparatus.

One of the primary advantages of the integral trim ring of the present invention is the avoidance of the costs of separate trim rings where heretofore have cost as much as $6 or more for each individual trim ring.

While the invention has been described with reference with specific embodiments, modifications and variations of the invention may be constructed without departing from this scope of the invention. The scope of the invention is defined in the following claims.

I claim:

1. Recessed ceiling lighting apparatus comprising:
   an electrical connector means for connecting to an electrical outlet, reflector means connected to the electrical connector for reflecting light generated by the lighting apparatus, lamp receptacle means connected to the reflector means for holding lamp apparatus, power supplying means connected to the reflector means and to the electrical connector means for supplying power from the electrical connector means to the lamp receptacle means, whereby heat is transferred directly from the power supplying means and the receptacle means to the reflector means, lamp means connected to the lamp receptacle menas for providing light within the reflector, connection means connected to the electrical connector means and to the reflector means for holding the reflector means upward with the electrical connector means.

2. The apparatus of claim 1, further comprising:
   trim ring means connected to the reflector means and extending outward therefrom.

3. The apparatus of claim 2, wherein the trim ring means is integrally formed with the reflector means and extends outward from a lower edge of the reflector means for radiating heat from the power supplying means and from the receptacle means conducted through the reflector means to the integrally formed trim ring means.

4. The apparatus of claim 1, wherein the reflector means has a relatively small upper end and a relatively larger lower end, and where the receptacle means is mounted on the smaller upper end of the reflector means.

5. The apparatus of claim 1 wherein the receptacle means is mounted on an outer wall of the reflector means and wherein the receptacle means has cavity means opening inward in the reflector means and wherein the lamp means comprise fluorescent tube lamp means having base means for connecting with the cavity means the fluorescent tube lamp means extending downward and across the reflector means.

6. The apparatus of claim 5, wherein the lamp means comprise the first and second fluorescent lamps which extend across and downward from the receptacle means adjacent to and at angles to each other wherein the lamp means cross at a central position within an upper portion of the reflector means.

7. The apparatus of claim 1, wherein the power supplying means comprise ballast means mounted on an upper portion of the reflector means.

8. The apparatus of claim 6, wherein the power supplying means comprise first and second ballast mean rectilinearly arranged with first and second receptacle means on an upper outer portion of the reflector means.

9. The apparatus of claim 1, further comprising:
cover means covering the power supplying means and the receptacle means and positioned between an upper portion of the reflector means and the electrical connector means.

10. The apparatus of claim 9, wherein theconnection means comprises fastener means connected to the electrical connector means and to the reflector means for entrapping the cover means therebetween and for holding the reflector means upward toward the electrical connector means.

11. Recessed ceiling lighting apparatus comprising:
an electrical connector means for connecting to an electrical outlet, reflector means for reflecting light generated by the lighting apparatus, connection means connected to the electrical connector means and to the reflector means for holding the reflector means upward with the electrical connector means, lamp receptacle means connected to the reflector means for holding lamp apparatus, power supplying means mounted on the reflector means and electrrically connected to the lamp receptacle means and to the electrical connector means for supplying power from the electrical connector measn to the lamp receptacle means, lamp means connected to the lamp receptacle means for providing lighting within the reflecrtor, trim ring means integrally formed with the reflector means and extending downward from a lower edge of the reflector means.

12. The apparatus of claim 11, wherein the reflector means has a relatively small upper end and a relatively larger lower end, and where the receptacle means is mounted on the smaller upper end of the reflector means.

13. The apparatus of claim 11 wherein the receptacle means is mounted on an outer wall of the lamp means and wherein the receptacle means has cavity means opening inward in the reflector means and wherein the lamp m,eans comprise fluorescent tube lamp means havig base measn for connecting with the cavity means, the fluroescent tube lamp means extending downward and across the reflector means.

14. The apparatus of claim 13, wherein the lamp means comprse first and second fluorescent lamps which extend across and downward from the receptacle means at slight angles to each other wherein the lamp means cross at a central position within an upper portion of the reflector means.

15. The apparatus of claim 14, wherein the power supplying means comprise first and second ballast means rectilinearly arranged with first and second receptacle means on an upper outer portion of the reflector means.

16. The apparatus of claim 11, wherein the power supplying means comprise ballast means mounted on an upper portion of the reflector means.

17. The apparatus of claim 11, further comprising:
housing means housing the power supplying means and the receptacle means and positioned between an upper portion of the reflector means and the electrical connector means.

18. The apparatus of claim 17, wherein the connection means comprises fastener means connected to the electrical connector means and to the reflector means to entrapping the housing means therebetween and for holding the reflector means upward toward the electrical connector means.

19. The apparatus of claim 17, further comprising:
fastener means connecting the housing means to the reflector means.

20. The recessed lamp reflector apparatus comprising:
a concave reflector body, electrical connector means connected to the reflector body, and lamp means connected to the reflector body and to the electrical connector means, the body having a large open end, and an integrally formed trim ring means connected integrally to the open end of the reflector and extending generally outward therefrom for leveling the open outer end of the reflector with respect to a surface which the trim ring engages, for conducting heat from the reflector directly outward into the trim ring for radiation of heat therefrom, and for using a full opening in which the reflector is mounted for transmittal of light out of the reflector a power supply means electrically connected to the electrical connector and to the lamp means and mounted directly on the reflector for conducting heat from the power supply means through the reflector and to the trim ring means.

* * * * *

UNITED STATES PATENT OFFICE
CERTIFICATE OF CORRECTION

Page 1 of 2

Patent No. 4,922,393               Dated May 1, 1990

Inventor(s) RHETT MCNAIR

It is certified that error appears in the above-identified patent and that said letters Patent is hereby corrected as shown below:

Column 1, line 42, correct "space";

line 50, before "energy consumption" insert --which have low power consumption and high lifetime, greatly reducing costs in installation, material costs, maintenance and--.

Column 2, line 45, correct "maintenance";

line 46, correct "the tubular";

line 51, change "ot" to --to--.

Column 3, line 21, correct "means".

Column 4, line 21, change "o" to --of--;

line 41, after "lens" insert --in--.

UNITED STATES PATENT AND TRADEMARK OFFICE
CERTIFICATE OF CORRECTION

PATENT NO. : 4,922,393
DATED : May 1, 1990
INVENTOR(S) : Rhett McNair It is certified that error appears in the above-identified patent and that said Letters Patent is hereby corrected as shown below:

Column 5, line 23, after "cross" insert --and--.

Column 6, line 14, change "where" to --which--;

line 17, change "with" to --to--.

Claim 8, line 2, correct "means" (2nd occur.)

Claim 10, line 1, correct "the connection".

Claim 14, line 2, correct "comprise".

Claim 18, line 3, change "to" (2nd occur.) to --for--.

Signed and Sealed this

Twenty-seventh Day of August, 1991

Attest:

HARRY F. MANBECK, JR.

Attesting Officer

Commissioner of Patents and Trademarks